AIR CONDITIONING SYSTEM
Filed May 7, 1956 2 Sheets-Sheet 1
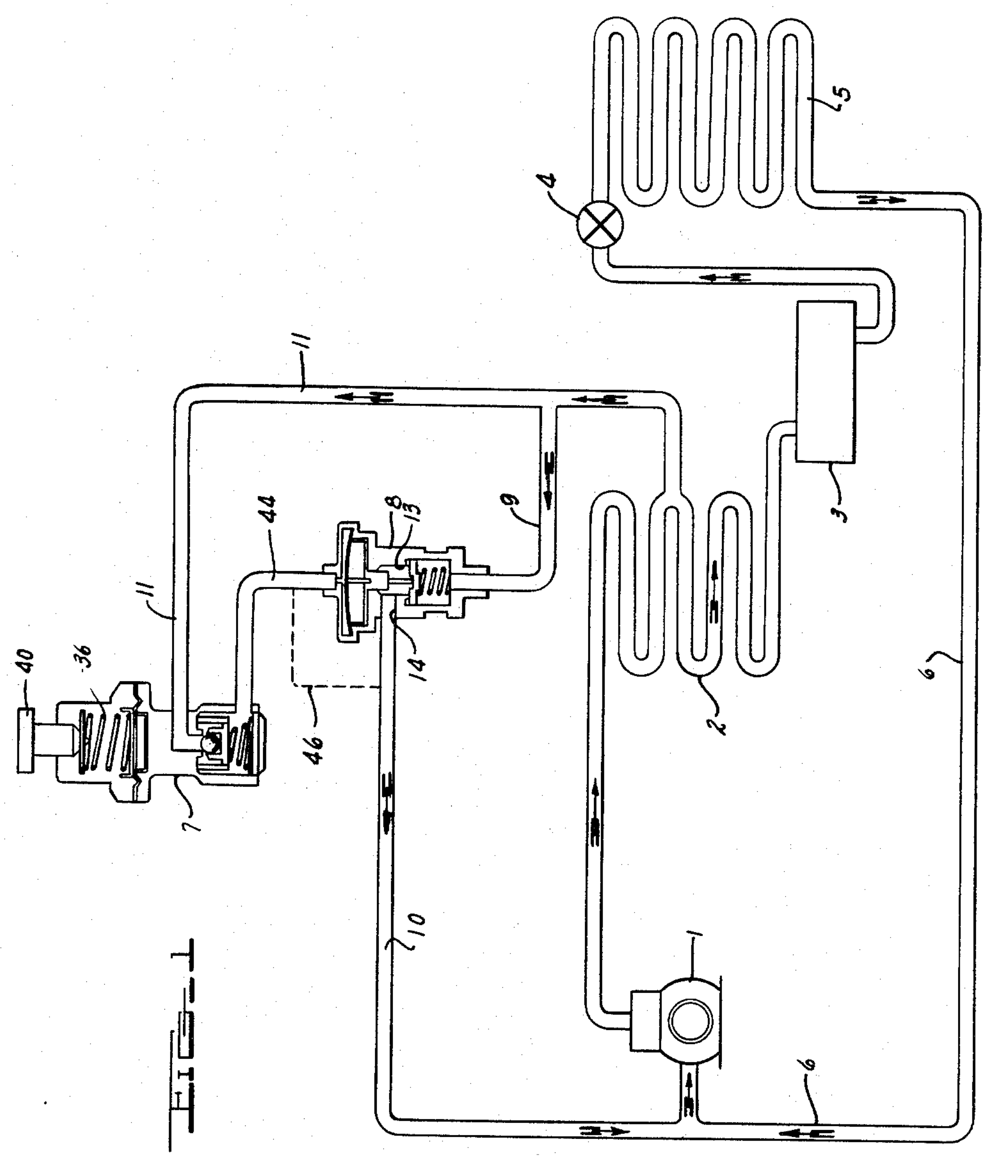
INVENTORS.
EARNEST J. DILLMAN
THOMAS E. NOAKES
HAROLD G. PHILPS
BY
SMITH, OLSEN, LEWIS & McRAE
ATTORNEYS

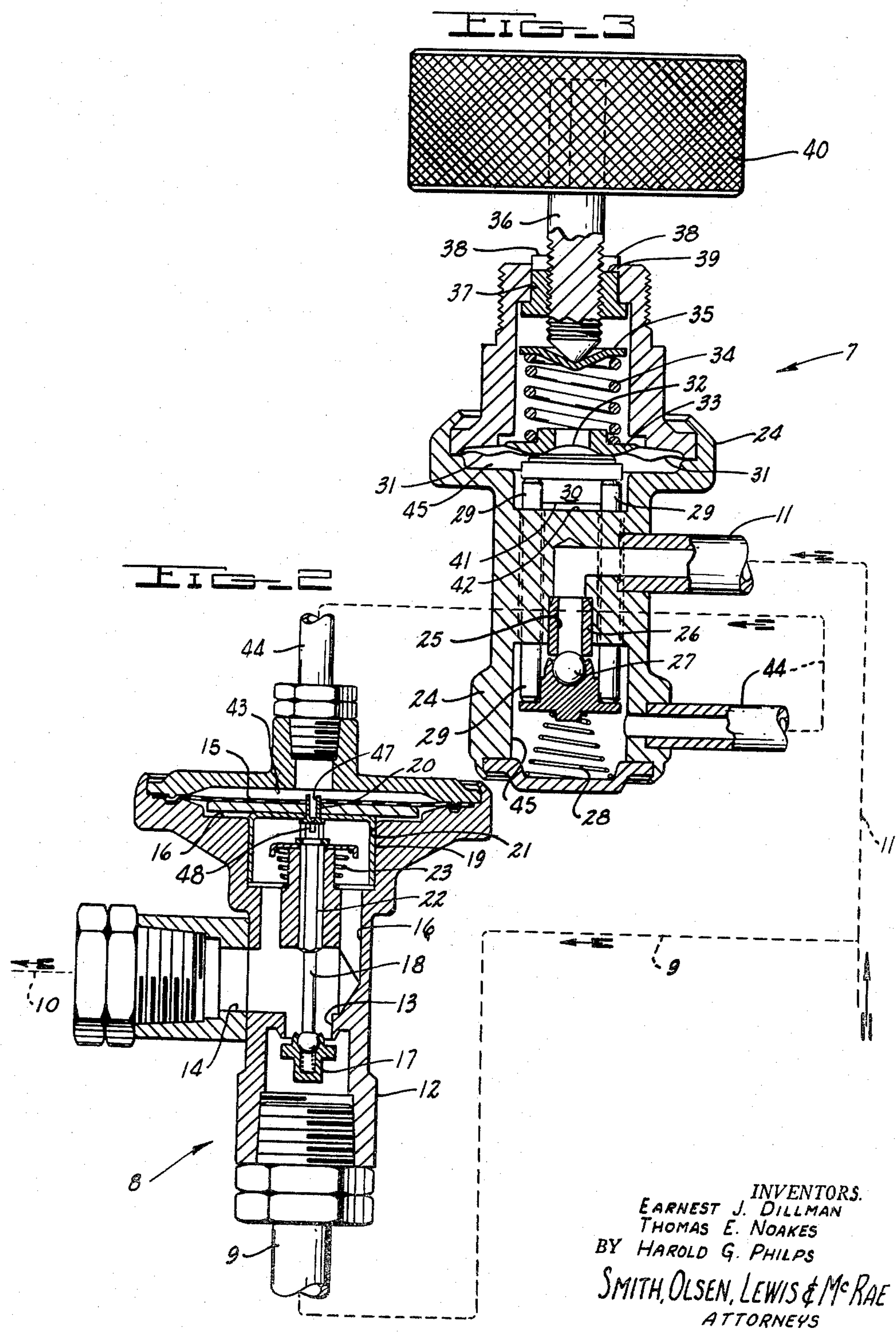
INVENTORS.
EARNEST J. DILLMAN
THOMAS E. NOAKES
BY HAROLD G. PHILPS
SMITH, OLSEN, LEWIS & McRAE
ATTORNEYS United States Patent Office 2,936,595

Patented May 17, 1960

2,936,595

AIR CONDITIONING SYSTEM

Earnest J. Dillman, Thomas E. Noakes, and Harold George Philps, Detroit, Mich., assignors, by mesne assignments, to American Radiator & Standard Sanitary Corporation, New York, N.Y., a corporation of Delaware Application May 7, 1956, Serial No. 583,058

1 Claim. (Cl. 62—197)

This invention relates to an air conditioning system having a fluid pressure regulator; i.e. a device wherein the outlet pressure is controlled or maintained constant irrespective of fluctuations in inlet pressure.

An object of the invention is to provide an air conditioning system with a fluid pressure regulator wherein manually actuable means is provided for varying the outlet pressure at any of several desired constant values.

Another object is to provide an air conditioning system with a pressure regulator wherein the outlet pressure can be varied over a large range of values.

Another object is to provide an air conditioning system with a pressure regulator having the ability to maintain the outlet pressure within fairly close tolerance values.

Other objects of this invention will appear in the following description and appended claim, reference being had to the accompanying drawings forming a part of this specification wherein like reference characters designate corresponding parts in the several views.

In the drawings:

Fig. 1 is a schematic view of an automobile air conditioning system employing a pressure regulator of the instant invention.

Fig. 2 is a sectional view of one component of the pressure regulator shown in Fig. 1.

Fig. 3 is a sectional view of another component of the pressure regulator shown in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown an automobile air conditioning system wherein the compressor 1 is driven by the automobile engine (not shown). The system includes a condenser 2, a receiver 3, an expansion valve 4 and an evaporator 5.

It is necessary that the system be effective to cool the automobile at low engine speeds, and accordingly the compressor capacity must be large enough to produce the desired refrigerant action at low engine speeds. The compressor capacity increases with increasing automobile speeds, and mechanism must therefore be provided to by pass some of the refrigerant around the evaporator at high engine speeds. The temperature in the evaporator (which we wish to maintain at a desired constant value, irrespective of the engine speed) is proportional to the pressure in suction line 6. Control of the evaporator temperature and cooling action can therefore be effected by maintaining a constant pressure in line 6. Under the present invention the control of pressure in line 6 is effected by bypassing some of the fluid from the condenser into and through the pressure regulator mechanisms indicated by numerals 7 and 8. The pressure in lines 9 and 11 will fluctuate in accordance with the engine speed, but due to the regulating action of mechanisms 7 and 8 (as will be hereinafter explained) the pressure in line 10 will be maintained constant. The pressure in line 10 will determine the pressure in line 6 and will thereby control the cooling action of evaporator 5.

Regulator component 8 includes a housing 12 forming an inlet port 13, and an outlet port 14. A movable wall in the form of a rubber diaphragm 15 serves to form a variable volume chamber 16 in housing 12.

In order to restrict the opening formed by port 13 there is provided a port-restricting element 17. A hexagonal rod 18 interconnects element 17 with diaphragm 15, so that they move together as a unit during pressure change within housing 12. In order to insure a straight line movement of diaphragm 15 there is provided a hexagonally shaped cup 19 carried on a shoulder-forming element 20. The upper end of rod 18 abuts against the lower face of element 20. A light compression spring 23 holds rod 18 against element 20 when there is no pressure in line 9.

Cup 19 slidably works in a cylindrical bore 21 formed in housing 12, with the six edges of the "hexagon" slidably riding on the bore wall. The edge contact between cup 19 and bore 21 provides low frictional resistance to diaphragm movement and thereby contributes to maximum sensitivity of the regulator in response to pressure change in line 9. Hexagonal rod 18 also works frictionlessly in a cylindrical bore 22.

Regulator component 7 includes a housing 24 provided with an inlet port 25 formed by a cylindrical insert 26. A port-restricting element 27 is positioned below port 25, and a light compression spring 28 holds element 27 against the lower ends of three equi-angularly spaced rods 29 (only two of which are visible in the drawings). The upper ends of rods 29 abut against the outermost annular face of a stepped pressure block 30. The upper face of block 30 is flat and abuts against the lower face of a corrugated metal diaphragm 31. Diaphragm 31 includes a central "bump" or dome-shaped portion 32 which serves to prevent lateral displacement of a pressure ring 33. A compression spring 34 is positioned between ring 33 and a disc 35. Disc 35 is movable vertically by manual rotation of a threaded shaft 36. Shaft 36 meshes with an internally threaded collar 37. Collar 37 includes a slot 38 which receives a flange 39 of housing 24. Flange 39 cooperates with slot 38 to prevent rotary movement of collar 37. As a result rotary movement of shaft 36 (by manual rotation of knob 40) is effective to move shaft 36 up and down in collar 37 so as to decrease and increase the spring force on movable diaphragm 31. In the absence of pressure within the chamber formed below diaphragm 31 the lower face 41 of block 30 seats against interior surface 42 of housing 24.

Under the present invention the ratio between port area 13 and the "effective" area of diaphragm 15 must be the same as the ratio between port area 25 and the "effective" area of diaphragm 31. The term "effective" area is that area which, when multiplied by the unit pressure to which one face of the diaphragm is subjected, will balance the opposing force on the opposite face of the diaphragm without any unbalance in the opposing forces. In other words the diaphragm must be in a "floating" condition. The "actual" ratio between the diaphragm area and port area will in the case of the metal diaphragm have to be larger than in the case of the rubber diaphragm in order to obtain the desired effective area ratio, since the resilience of the rubber is much greater than that of the metal. Thus the metal diaphragm has a vastly greater resistance to flexure than the rubber diaphragm, and it is therefore necessary to employ a proportionately larger metal diaphragm in order to obtain the same desired flexibility. The term "proportionately" will be understood as a reference between the port area and its diaphragm area, and not as a reference between the two diaphragm areas. In practice the actual area of the metal diaphragm may be smaller than the actual area of the rubber diaphragm.

The operation of the regulator mechanism may best be understood if concrete values for the diaphragm areas, port areas, and fluid pressures are assumed. Assume for example that the effective area of diaphragm 15 is 2 square inches, the area of port 13 is .1 square inch, the effective area of diaphragm 31 is 1 square inch, the area of port 25 is .05 inch, the initial pressure in lines 9 and 11 is 100 p.s.i. and the outlet pressure in port 14 is 20 p.s.i. (note that the ratio of effective diaphragm area to port area is in each case 20 to 1—the actual ratio may be other than 20 to 1 but it must be the same for each of the diaphragm-port arrangements). It is desired to analyze whether or not the outlet pressure can be maintained at 20 p.s.i. with change in the pressure in lines 9 and 11, as for example with a change of pressure from 100 p.s.i. to 200 p.s.i.

Initially the forces acting on the underside of diaphragm 15 are those due to the pressure within chamber 16 (20 p.s.i.) and the pressure acting against element 17 (100 p.s.i.). Numerically the total pressure on the underside of diaphragm 15 is $(20\times2)+(100\times.1)$ or 50 pounds. The pressure within chamber 43, line 44 and chamber 45 is (50/2) or 25 p.s.i.

The forces acting upwardly on diaphragm 31 must equal the forces acting downwardly on the diaphragm 31. The upward forces are those due to the fluid within chamber 45. The downward forces are those due to spring 34 and the fluid in line 11.

The upward forces on diaphragm 31 are (25 p.s.i.×effective area of diaphragm 31) or 25 pounds.

The opposing downward force of 25 pounds includes $(100\times.05)$ or 5 pounds due to the fluid in line 11. The required spring force thereby works out to be 20 pounds.

If it now be assumed that the pressure in lines 9 and 11 is raised to 200 p.s.i. the total force acting on the lower face of diaphragm 15 will be increased to $$(200\times.1+20\times2)$$

or 60 pounds. The pressure within chamber 45 will thereby be increased to (60/2) or 30 pounds. This 30 pound pressure must be balanced by the total downward pressure on diaphragm 31 (due to spring 34 and the fluid in line 11) if the pressure in line 10 is to be maintained at the desired 20 pounds. The total downward pressure on diaphragm 31 is (20 pounds due to the spring and $200\times.05$ pound due to the fluid in line 11) or 30 pounds. This downward pressure is just sufficient to balance the upward pressure within chamber 45 so as to maintain the desired pressure of 20 pounds in line 10. By mathematical calculation it can be ascertained that the outlet pressure in line 10 can be maintained at the desired 20 pounds with other fluctuations of pressure in lines 9 and 11.

The actual value of the pressure in line 10 is determined by the force of spring 34. If the spring force on diaphragm 31 is increased the outlet pressure in line 10 will be correspondingly increased. If the spring force on diaphragm 31 is decreased the outlet pressure in line 10 will be correspondingly decreased. The spring force may in the illustrated embodiment be varied by rotation of knob 40.

During the foregoing specification chamber 43, line 44 and chamber 45 have been treated as distinct "fluid-retaining" mechanisms. Actually however these mechanisms are in such uninterrupted communication with each other that they may be considered as one chamber.

In order that the illustrated mechanism can be made to operate after the initial pressure change it is necessery that a bleed passage be provided between the areas of different pressures. This bleed passage may take several forms, as for example the conduit indicated by numeral 46 in Fig. 1 or the passage defined by bore 47 and slot 48 in Fig. 2.

Thus far the problem of outlet pressure control has been considered from the standpoint of obtaining a constant outlet pressure with variations in inlet pressure. The method of control consists in maintaining the same port area to movable wall area for each port-movable wall combination.

It is possible however according to the present invention to provide a control or predetermined variation in the outlet pressure with variations in inlet pressure. This variation in outlet pressure is obtained by holding the two port area to movable wall ratios at different values according to the following formula:

$$(1) \qquad \Delta P_2=\Delta P_1\ (O_2/D_2-O_1/D_1)$$

where:

$\Delta P_2$ is the desired outlet pressure change obtained with a given inlet pressure variation
$\Delta P_1$ is the inlet pressure variation (in lines 9 and 11)
$O_2$ is the area of port 25
$D_2$ is the effective area of wall 31
$O_1$ is the area of port 13, and
$D_1$ is the effective area of movable wall 15.

The above formula was obtained from a consideration of the forces acting on the system disclosed in Figs. 2 and 3. These forces are balanced according to the following formula or equation:

$$(2) \qquad (P_1O_1+P_2D_1)D_2/D_1=\text{force of spring } 34+P_1O_2$$

During pressure variation the force of spring 34 remains constant, and the spring force does not therefore influence the outlet pressure variation obtained with a given inlet pressure change. Equation 2 can be utilized to determine the factors which influence the extent of outlet pressure variation obtainable with a given inlet pressure variation, and in this connection the ultimate variation will be found by mathematical reduction of Equation 2 to take place according to Formula 1.

It will be seen by reference to Formula 1 that for a given inlet pressure variation the outlet pressure variation can be predetermined or controlled by regulating the O/D ratios. If, for example the $O_1/D_1$ ratio is (by design of the valve) held to a value less than the value of the $O_2/D_2$ ratio the outlet pressure can be made to increase in response to an increase in inlet pressure. If, on the other hand the $O_1/D_1$ ratio is held to a value greater than the $O_2/D_2$ ratio the outlet pressure can be made to decrease in response to an increase in inlet pressure. The extent of the outlet pressure variation can be controlled by choosing the various O/D ratios in accordance with Formula 1.

We claim:

The combination comprising a refrigerant compressor; a condenser in fluid communication with said compressor; an evaporator; a line from the condenser to the evaporator; a suction line from the evaporator to the compressor; a pressure line from the compressor to the suction line but bypassing the evaporator and at least a portion of the condenser, and pressure regulator means in said second pressure line whereby to control the suction line pressure so as to maintain a fairly even evaporator temperature with fluctuations in compressor speed; said pressure regulator means comprising housing means forming first and second ports, both exposed to the inlet fluid presure; a first movable wall within the housing means forming a first chamber in communication with the first port and a second chamber in communication with the second port; said second chamber being in part formed by a second movable wall; a first port-closing element closable against said first port by inlet fluid pressure and connected for movement with said first movable wall; a second port-closing element openable from said second port by inlet fluid pressure and connected for movement with said second movable wall; and an outlet port in one wall of the first chamber; the ratio of the first port area to the effective area of the first movable wall being the same as the ratio of the second port area to the effective area of the second movable wall.

References Cited in the file of this patent

UNITED STATES PATENTS

| | | |
|---|---|---|
| 2,082,223 | Smith | June 1, 1937 |
| 2,178,974 | Smith | Nov. 7, 1939 |
| 2,699,043 | Kramer | Jan. 11, 1955 |

FOREIGN PATENTS

| | | |
|---|---|---|
| 708,143 | Great Britain | Apr. 28, 1954 |